(12) United States Patent
Li et al.

(10) Patent No.: US 12,174,721 B2
(45) Date of Patent: Dec. 24, 2024

(54) METHOD, ELECTRONIC DEVICE, AND COMPUTER PROGRAM PRODUCT FOR EXPORTING LOG

(71) Applicant: DELL PRODUCTS L.P., Round Rock, TX (US)

(72) Inventors: Huifeng Li, Shanghai (CN); Ren Wang, Shanghai (CN); Weiyang Liu, Shanghai (CN); Jinjin Wang, Shanghai (CN); Qi Wang, Shanghai (CN); Yuefeng Li, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 135 days.

(21) Appl. No.: 17/729,832

(22) Filed: Apr. 26, 2022

(65) Prior Publication Data

US 2023/0273869 A1 Aug. 31, 2023

(30) Foreign Application Priority Data

Feb. 25, 2022 (CN) .......................... 202210176863.9

(51) Int. Cl.
*G06F 11/30* (2006.01)
*G06N 20/20* (2019.01)

(52) U.S. Cl.
CPC ...... *G06F 11/3086* (2013.01); *G06F 11/3075* (2013.01); *G06N 20/20* (2019.01)

(58) Field of Classification Search
CPC ............. G06F 11/3086; G06F 11/3075; G06F 11/3476; G06N 20/20; G06N 3/09
See application file for complete search history.

(56) References Cited

U.S. PATENT DOCUMENTS

| 8,024,778 B2 * | 9/2011 | Cash ...................... G06Q 30/04 726/4 |
| 10,609,042 B2 * | 3/2020 | Quinn ................... H04L 63/107 |
| 2001/0049620 A1 * | 12/2001 | Blasko ............... G06Q 30/0207 705/14.1 |
| 2015/0095909 A1 * | 4/2015 | Li ....................... G06F 9/45558 718/1 |
| 2022/0046038 A1 * | 2/2022 | Sinha .................. H04L 63/0236 |

OTHER PUBLICATIONS

Qin, Xiulei, et al. "Optimizing data migration for cloud-based key-value stores, "Proceedings of the 21st ACM international conference on Information and knowledge management, 2012.*

* cited by examiner

*Primary Examiner* — Abdullahi E Salad
(74) *Attorney, Agent, or Firm* — WOMBLE BOND DICKINSON (US) LLP (57) ABSTRACT

Embodiments of the present disclosure provide a method, an electronic device, and a computer program product that involve exporting a log. The method includes acquiring a first set of attributes indicating a target asset among assets protected by a data protection product, a second set of attributes indicating target tasks executed on the target asset, and a third set of attributes indicating a computing resource running the data protection product. The method further includes determining an export time consumed to export a log of the target asset based on the first set of attributes, the second set of attributes, and the third set of attributes. With the embodiments of the present disclosure, the time required for exporting a log can be accurately estimated while the log is exported.

20 Claims, 7 Drawing Sheets

METHOD, ELECTRONIC DEVICE, AND COMPUTER PROGRAM PRODUCT FOR EXPORTING LOG

CROSS-REFERENCE TO RELATED APPLICATION

This patent application claims priority, under 35 U.S.C. § 119, of Chinese Patent Application No. 202210176863.9, filed Feb. 25, 2022, which is incorporated by reference in its entirety.

TECHNICAL FIELD

Embodiments of the present disclosure relate to the field of computers, and more specifically, to a method, an electronic device, an apparatus, a medium, and a computer program product for exporting a log.

BACKGROUND

With the development of data storage and protection technologies, data protection systems suitable for a wide variety of data storage environments have been developed. Protected data (also referred to as assets) may include data from multiple components in a data storage environment, and therefore, when it is necessary to export a log of a target asset in a complex environment, the required time and the size of the log are difficult to estimate. Therefore, among existing data protection products, there is no data protection product that can provide functions for predicting the time for exporting a log and the size of the log file. Thus, there is an urgent need for a method that can accurately estimate the export time and the exported file size while exporting a log.

SUMMARY OF THE INVENTION

Embodiments of the present disclosure provide a method, an electronic device, an apparatus, a medium, and a computer program product for exporting a log.

According to a first aspect of the present disclosure, a method for exporting a log is provided. The method includes acquiring a first set of attributes indicating a target asset among assets protected by a data protection product, a second set of attributes indicating target tasks executed on the target asset, and a third set of attributes indicating a computing resource running the data protection product. The method further includes determining an export time consumed to export a log of the target asset based on the first set of attributes, the second set of attributes, and the third set of attributes.

According to a second aspect of the present disclosure, an electronic device is also provided. The electronic device includes a processor and a memory coupled to the processor, and the memory has instructions stored therein which, when executed by the processor, cause the device to perform actions. The actions include acquiring a first set of attributes indicating a target asset among assets protected by a data protection product, a second set of attributes indicating target tasks executed on the target asset, and a third set of attributes indicating a computing resource running the data protection product. The actions further include determining an export time consumed to export a log of the target asset based on the first set of attributes, the second set of attributes, and the third set of attributes.

According to a third aspect of the present disclosure, an apparatus for exporting a log is provided. The apparatus includes a set acquisition module configured to acquire a first set of attributes indicating a target asset among assets protected by a data protection product, a second set of attributes indicating target tasks executed on the target asset, and a third set of attributes indicating a computing resource running the data protection product. The apparatus further includes a log export module configured to determine an export time consumed to export a log of the target asset based on the first set of attributes, the second set of attributes, and the third set of attributes.

According to a fourth aspect of the present disclosure, a computer-readable storage medium is provided, which includes machine-executable instructions that, when executed by a device, cause the device to execute the method according to the first aspect of the present disclosure.

According to a fifth aspect of the present disclosure, a computer program product is provided. The computer program product is tangibly stored on a computer-readable medium and includes machine-executable instructions, where the machine-executable instructions, when executed by a device, cause the device to execute the method according to the first aspect of the present disclosure.

The Summary of the Invention part is provided to introduce the selection of concepts in a simplified form, which will be further described in the Detailed Description below. The Summary of the Invention part is neither intended to identify key features or essential features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar drawing marks represent identical or similar elements, in which.

In all the accompanying drawings, identical or similar reference numerals indicate identical or similar elements.

DETAILED DESCRIPTION

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

The inventors note that in data protection products, the time consumption for exporting a log is highly variable due to the complexity of storage devices of data (also referred to as assets, no distinction being made between data and assets hereinafter), the diversity of users, differences in computing systems that allow data protection products, differences in usage environments (e.g., network speed), and so on. This brings bad user experience to users, and makes them unable to make advance arrangements, thus affecting their work.

In view of this, the method of the present disclosure provides a method for exporting a log. The method utilizes various factors associated with log export, each of which may individually or in combination affect the time consumed by exporting a log. Therefore, by taking these factors into account and using a reasonable algorithm, it is possible to accurately estimate the time required to export a log.

Figure 1:
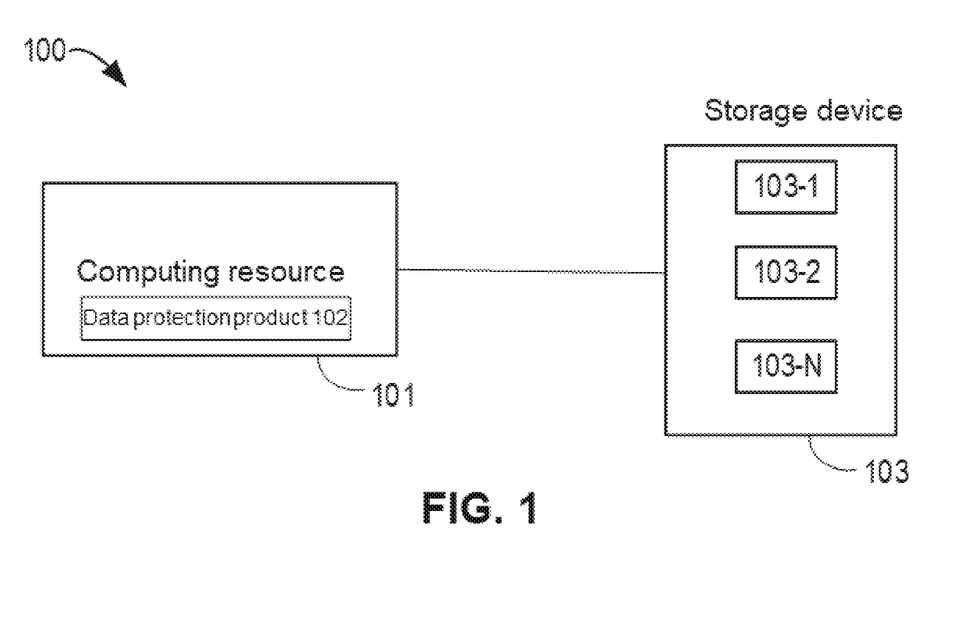
FIG. 1 illustrates a schematic diagram of an example environment in which embodiments of the present disclosure can be implemented.

FIG. 1 illustrates a schematic diagram of example environment 100 in which embodiments of the present disclosure can be implemented.

In environment 100, computing resource 101 (e.g., a computing system or a server) has data protection product 102 installed thereon. Through a network, data protection product 102 is connected to a user. Assets protected by the data protection product may be stored in multiple storage devices 103-1, 103-2, 103-N (individually or collectively referred to as storage device 103). Storage device 103 is connected to computing resource 101.

Figure 2:
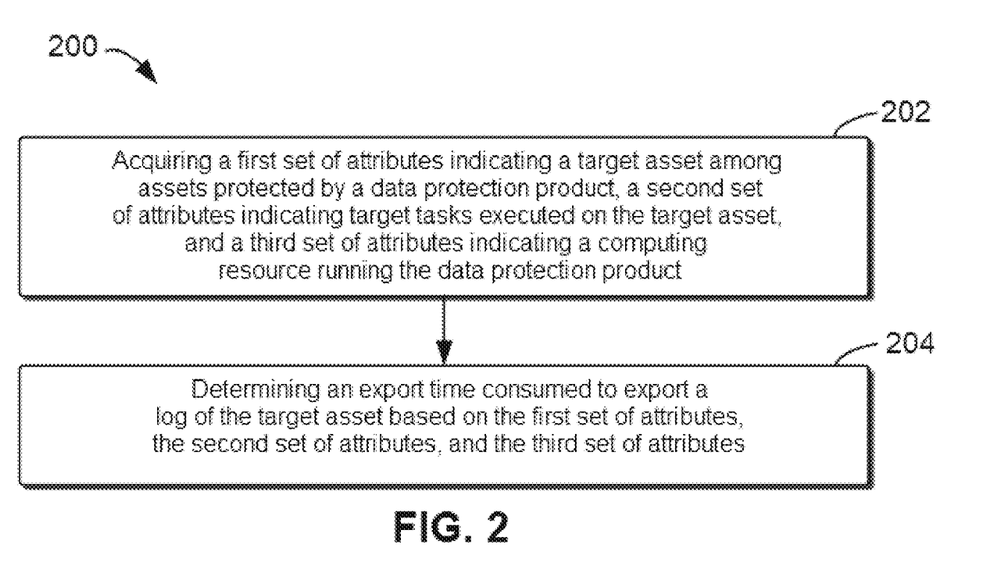
FIG. 2 schematically illustrates a flow chart of a method for exporting a log according to an example implementation of the present disclosure.

FIG. 2 schematically illustrates a flow chart of method 200 for exporting a log according to an example implementation of the present disclosure.

At block 202, a first set of attributes including a target asset among assets protected by a data protection product, a second set of attributes of target tasks executed on the target asset, and a third set of attributes of a computing resource running the data protection product are acquired.

In some embodiments, the first set of attributes may include the number of Structured Query Language (SQL) assets, the number of file system assets, the number of virtual machine assets, the number of network attached storage (NAS) assets, the number of SAP HANA assets, and the number of Kubernetes K8S assets. The first set of attributes may also include the number of data protection policies in the entire data protection system and the number of data protection phases in the entire data protection system.

In some embodiments, the second set of attributes may include the number of target tasks, sizes of the assets (e.g., in bytes), data sizes of compressed assets, data sizes of transmitted assets, type of the target tasks, the frequency at which the target tasks are executed, subtasks of the target tasks, the number of times of successful execution of the subtasks, the number of times of failed execution of the subtasks, and the number of canceled subtasks.

In some embodiments, the third set of attributes may include attributes of the computing resource running the data protection product, for example, hardware attributes. For example, the number of cores of the CPU, the primary frequency of the cores, the IO access speed of a storage device, the PCIE type, the network bandwidth, the network delay, and so on.

At block 204, an export time consumed to export a log of the target asset is determined based on the first set of attributes, the second set of attributes, and the third set of attributes.

In some embodiments, the first set of attributes, the second set of attributes, and the third set of attributes may be input to a machine learning model, and the machine learning model may accurately determine how much time will be consumed to export the log based on these input attributes.

It will be understood that the attributes that may be included in the first set of attributes, the second set of attributes, and the third set of attributes are all closely related to the time required to export the log. Thus, after considering these important and closely related attributes, a reasonably trained machine learning model is utilized, so that the determined time required to export the log is relatively accurate.

In some embodiments, the method may further include determining the export time consumed to export the log of the target asset based on a fourth set of attributes including a type of a customer owning the target asset, a time at which the export of the log occurs, and a time length of continuous operation of the data protection product. That is, the first set of attributes, the second set of attributes, the third set of attributes, and the fourth set of attributes may all be input into the machine learning model, and the export time consumed to export the log of the target asset may be determined using the machine learning model.

In some embodiments, the time at which the export of the log occurs may be accurate to a day (e.g., one day of the week) or to a finer granularity (one hour of the day). For example, the operation of exporting the log is performed in the morning of Wednesday (more specifically, at 10:00 am).

In some embodiments, the method may further include determining a size of the log of the target asset using the machine learning model.

In some embodiments, the type of the asset may include at least Structured Query Language (SQL) asset, file system asset, virtual machine asset, network attached storage (NAS) asset, SAP HANA asset, and Kubernetes K8S asset.

In some embodiments, the method may further include exporting the log of the target asset during the export time.

In some embodiments, the machine learning model is a multilayer perceptron, and the multilayer perceptron may include at least a first hidden layer, a second hidden layer, and a third hidden layer, and a first number of nodes of the first hidden layer is determined by: selecting a specified number of attributes from the first set of attributes, the second set of attributes, the third set of attributes, and the fourth set of attributes, and determining the first number of nodes as the smallest positive integer power of 2 greater than or equal to the specified number.

In some embodiments, at least ten attributes are selected from the first set of attributes, the second set of attributes, the third set of attributes, and the fourth set of attributes; values that satisfy the following conditions are determined: (i) being greater than or equal to the number of the selected attributes, and (ii) being a positive integer power of 2; and the minimum value satisfying the conditions is determined as the first number of nodes. The machine learning model used in the present disclosure will be described in detail below with reference to FIG. 3.

Figure 3:
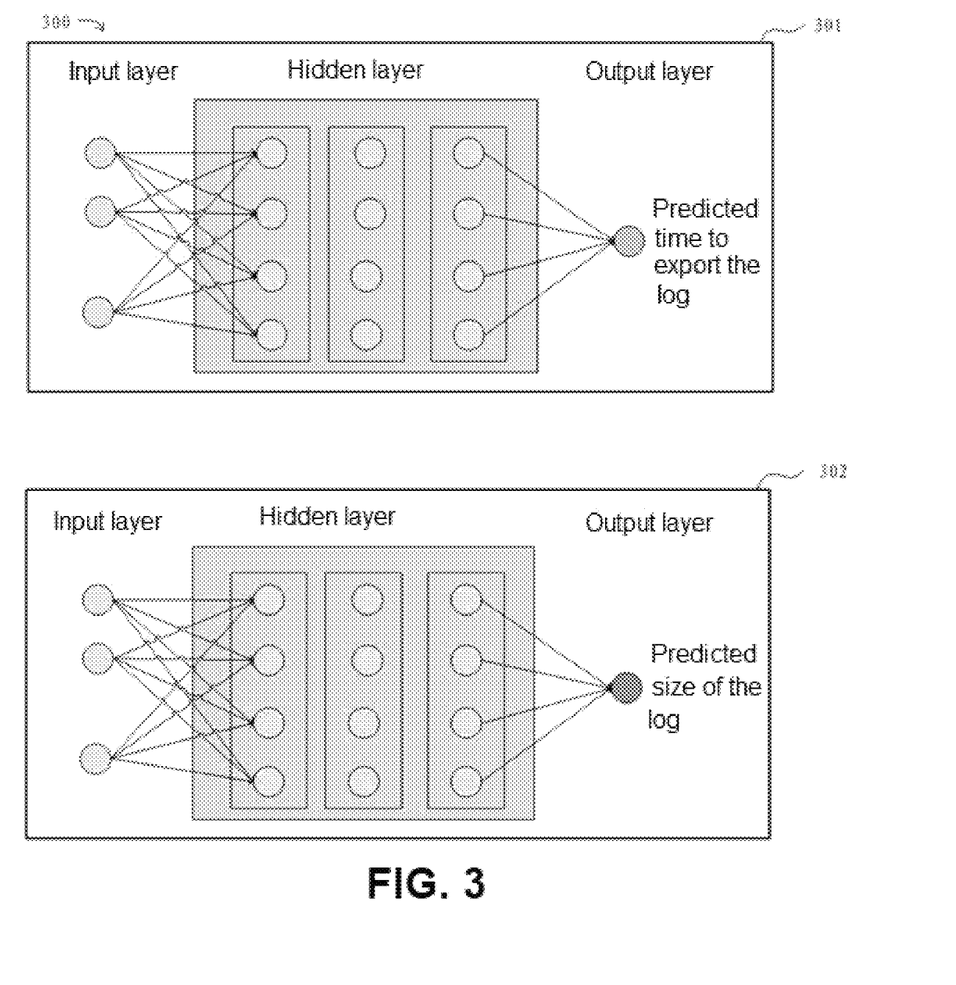
FIG. 3 schematically illustrates a schematic diagram of a machine learning model according to an example implementation of the present disclosure.

FIG. 3 schematically illustrates a schematic diagram of machine learning model 300 according to an example implementation of the present disclosure.

As shown in the figure, this machine learning model 300 may include first module 301 and second module 302. The first module is configured to determine the time required to export the log. The second module is configured to determine the size of the exported log.

The structures of first model 301 and second module 302 may be the same or different. In FIG. 3, first module 301 and second module 302 are shown with the same structure, both being a fully connected structure. The structure includes an input layer, a hidden layer, and an output layer, where the number of nodes in the input layer is the same as the sum of the attributes in the first set of attributes, the second set of attributes, the third set of attributes, and the fourth set of attributes. Here, the attributes may also be referred to as features, and no distinction will be made between attributes and features hereinafter. The output layer has a node for outputting the time required to export the log or the size of the exported log.

In some embodiments, there may be 3 hidden layers. The number of nodes in the first hidden layer needs to satisfy the following equation:

$$h1_{min} = \min_{x}(x \geq n \text{ and } x = 2^t t \in N^+)$$

where x denotes the number of attributes selected from the first set of attributes, the second set of attributes, the third set of attributes, and the fourth set of attributes, t denotes a positive integer, $h1_{min}$ denotes the minimum number of the first hidden layers, and min denotes the operation to find the minimum value.

In some embodiments, a second number of nodes of the second hidden layer is greater than or equal to the first number of nodes, and a third number of nodes of the third hidden layer is greater than or equal to the first number of nodes.

Figure 4:
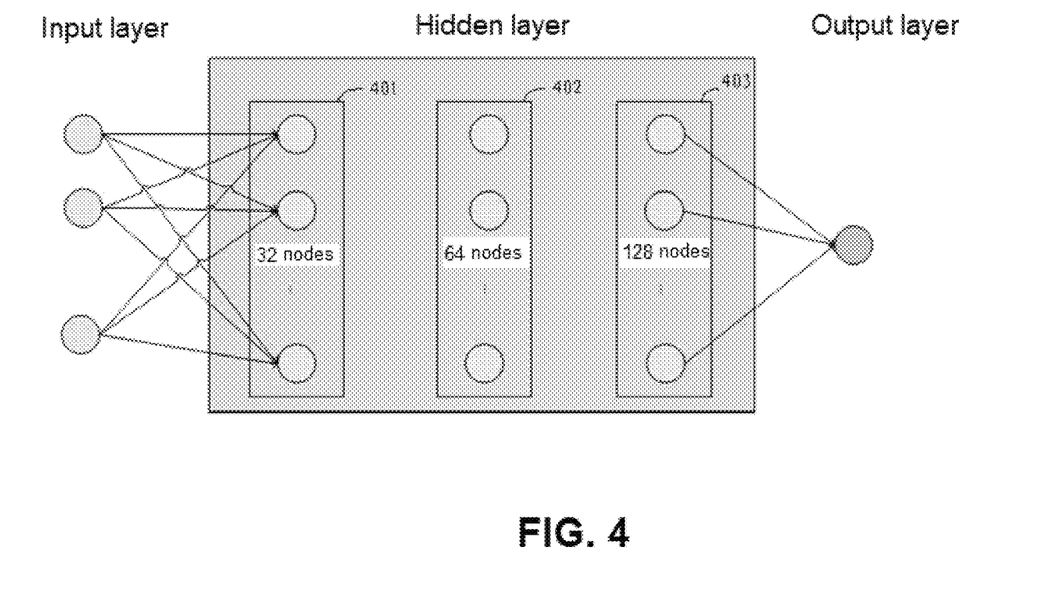
FIG. 4 schematically illustrates a schematic diagram of a hidden layer of a machine learning model according to an example implementation of the present disclosure.

FIG. 4 schematically illustrates a schematic diagram of a hidden layer of a machine learning model according to an example implementation of the present disclosure.

As shown in the figure, by way of example only, first hidden layer 401 may include 32 nodes, second hidden layer 402 may include 64 nodes, and third hidden layer 403 may include 128 nodes.

In training the machine learning model, the machine learning model may be trained using the following training data which needs to satisfy the following condition: for a portion of the protected assets, at least ten attributes are selected from the attributes in the first set of attributes to the fourth set of attributes. The number of the portion of assets is determined in a certain proportion according to the number of total assets.

It can be understood that the machine learning model trained in this way adequately learns hidden relationships between the various attributes and the time to export the log and has the capacity to generalize. Thus, in the inference phase, it is possible to make a good determination (e.g., prediction) of the time to export the log for the target asset as well as the size of the log.

Figure 5:
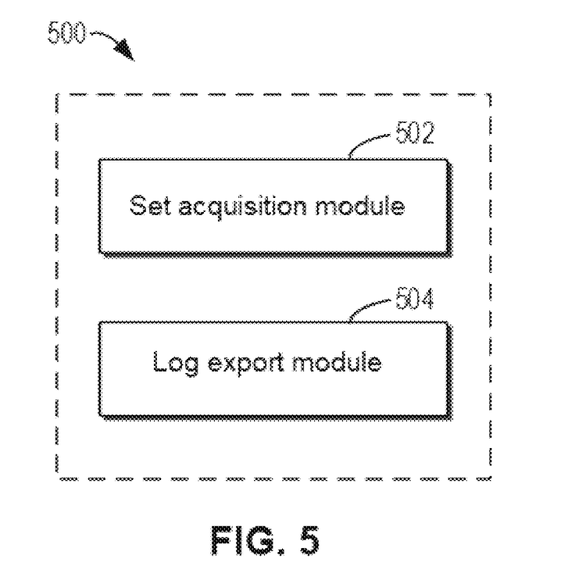
FIG. 5 schematically illustrates a block diagram of an apparatus for exporting a log according to an example implementation of the present disclosure.

FIG. 5 schematically illustrates a block diagram of an apparatus for exporting a log according to an example implementation of the present disclosure.

Set acquisition module 502 is configured to acquire a first set of attributes indicating a target asset among assets protected by a data protection product, a second set of attributes indicating target tasks executed on the target asset, and a third set of attributes indicating a computing resource running the data protection product.

Log export module 504 is configured to determine an export time consumed to export a log of the target asset based on the first set of attributes, the second set of attributes, and the third set of attributes.

In some embodiments, set acquisition module 502 may further be configured to determine the export time based on the first set of attributes, the second set of attributes, the third set of attributes, and a fourth set of attributes, wherein the fourth set of attributes includes a type of a customer owning the target asset, a time at which the export of the log occurs, and a time length of continuous operation of the data protection product.

In some embodiments, determining an export time consumed to export a log of the target asset comprises determining the export time using a machine learning model, wherein the machine learning model is a multilayer perceptron that comprises a first hidden layer, a second hidden layer, and a third hidden layer, and a first number of nodes of the first hidden layer is determined by: selecting a specified number based on the number of all attributes of the first set of attributes, the second set of attributes, the third set of attributes, and the fourth set of attributes; and determining the first number of nodes as the smallest positive integer power of 2 greater than or equal to the specified number.

In some embodiments, a second number of nodes of the second hidden layer may be greater than or equal to the first number of nodes, and a third number of nodes of the third hidden layer may be greater than or equal to the first number of nodes.

In some embodiments, log export module 504 may further be configured to determine a size of the log of the target asset using the machine learning model.

In some embodiments, the first set of attributes includes the number of Structured Query Language (SQL) assets, the number of file system assets, the number of virtual machine assets, the number of network attached storage (NAS) assets, the number of SAP HANA assets, the number of Kubernetes K8S assets, the number of data protection policies, and the number of data protection phases.

In some embodiments, the second set of attributes includes the number of the target tasks, types of the target tasks, the frequency at which the target tasks are executed, the number of subtasks of the target tasks, the number of successful subtasks, the number of failed subtasks, and the number of canceled subtasks.

In some embodiments, the third set of attributes includes the number of cores of a central processing unit (CPU) of the computing resource, the primary frequency of the cores, an access speed of a storage device, a type of high-speed serial computer expansion bus PCIE, a network bandwidth, and a network delay.

In some embodiments, log export module 504 may further be configured to export the log of the target asset during the export time.

It will be understood that apparatus 500 may also achieve at least one beneficial technical effect as can be achieved by method 200.

Figure 6:
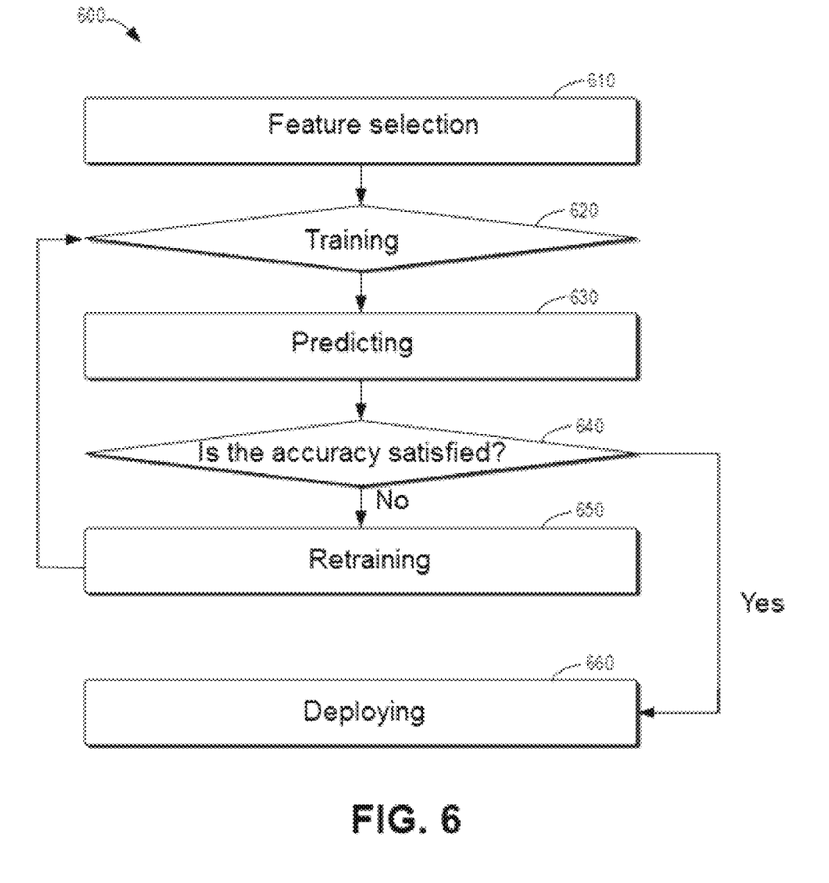
FIG. 6 schematically illustrates a flow chart of a method for training a machine learning model according to an example implementation of the present disclosure.

FIG. 6 schematically illustrates a flow chart of a method for training a machine learning model according to an example implementation of the present disclosure.

At block 610, some attributes are selected from a first set of attributes, a second set of attributes, a third set of attributes, and a fourth set of attributes, and the number of these attributes should be above a certain number (e.g., 10 to 13 attributes in total, and at least one attribute should be selected from each set of attributes). At this stage, these selected attributes are also referred to as features. The data obtained at this stage may be referred to as sample data.

At block 620, the selected features may be input into a machine learning model for training, and the training process may use a back propagation algorithm. When parameters of the machine learning model meet the requirements, the training process is ended.

At block 630, the machine learning model may be brought into an inference phase, in which test data is input to get a predicted result (i.e., predicted export time and log size) on the test data.

At block 640, if the error between the predicted result and the true result is large, the method proceeds to block 650. If the predicted result meets the requirement of accuracy, the method proceeds to block 660.

At block 650, the machine learning model is retrained with new training data (which may also include previously used sample data) and may be trained with more features.

At block 660, the machine learning model is deployed for real use by users.

Figure 7:
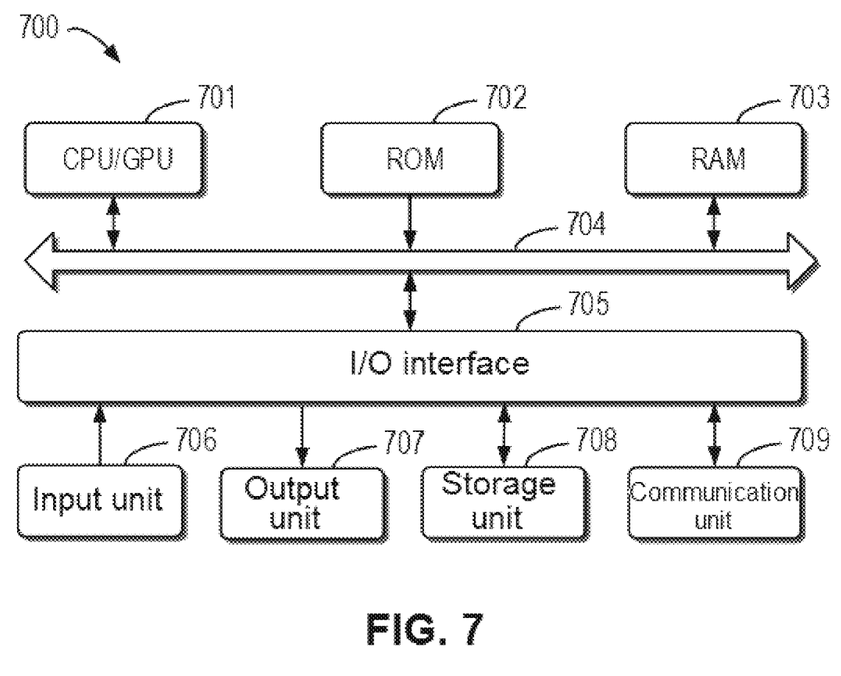
FIG. 7 schematically illustrates a block diagram of a device for exporting a log according to an example implementation of the present disclosure.

FIG. 7 illustrates a schematic block diagram of device 700 that may be used to implement embodiments of the present disclosure. Device 700 may be a device or apparatus as described in embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 onto random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by processing unit 701. For example, in some embodiments, the method may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for exporting a log is provided. The method includes acquiring a first set of attributes indicating a target asset among assets protected by a data protection product, a second set of attributes indicating target tasks executed on the target asset, and a third set of attributes indicating a computing resource running the data protection product. The method further includes determining an export time consumed to export a log of the target asset based on the first set of attributes, the second set of attributes, and the third set of attributes.

In some embodiments, determining an export time consumed to export a log of the target asset includes determining the export time based on the first set of attributes, the second set of attributes, the third set of attributes, and a fourth set of attributes, wherein the fourth set of attributes includes a type of a customer owning the target asset, a time at which the export of the log occurs, and a time length of continuous operation of the data protection product.

In some embodiments, determining an export time consumed to export a log of the target asset comprises determining the export time using a machine learning model, wherein the machine learning model is a multilayer perceptron that comprises a first hidden layer, a second hidden layer, and a third hidden layer, and a first number of nodes of the first hidden layer is determined by: selecting a specified number based on the number of all attributes of the first set of attributes, the second set of attributes, the third set of attributes, and the fourth set of attributes; and determining the first number of nodes as the smallest positive integer power of 2 greater than or equal to the specified number.

In some embodiments, a second number of nodes of the second hidden layer may be greater than or equal to the first number of nodes, and a third number of nodes of the third hidden layer may be greater than or equal to the first number of nodes.

In some embodiments, the method further includes determining a size of the log of the target asset using the machine learning model.

In some embodiments, the first set of attributes includes the number of Structured Query Language (SQL) assets, the number of file system assets, the number of virtual machine assets, the number of network attached storage (NAS) assets, the number of SAP HANA assets, the number of Kubernetes K8S assets, the number of data protection policies, and the number of data protection phases.

In some embodiments, the second set of attributes includes the number of the target tasks, types of the target tasks, the frequency at which the target tasks are executed, the number of subtasks of the target tasks, the number of successful subtasks, the number of failed subtasks, and the number of canceled subtasks.

In some embodiments, the third set of attributes includes the number of cores of a central processing unit (CPU) of the computing resource, the primary frequency of the cores, an access speed of a storage device, a type of high-speed serial computer expansion bus PCIE, a network bandwidth, and a network delay.

In some embodiments, the method further includes exporting the log of the target asset during the export time.

In a second aspect of the present disclosure, an electronic device is provided. The electronic device includes a processor and a memory coupled to the processor, and the memory has instructions stored therein which, when executed by the processor, cause the device to perform actions. The actions include acquiring a first set of attributes indicating a target asset among assets protected by a data protection product, a second set of attributes indicating target tasks executed on the target asset, and a third set of attributes indicating a computing resource running the data protection product. The actions further include determining an export time consumed to export a log of the target asset based on the first set of attributes, the second set of attributes, and the third set of attributes.

In some embodiments, determining an export time consumed to export a log of the target asset includes determining the export time based on the first set of attributes, the second set of attributes, the third set of attributes, and a fourth set of attributes, wherein the fourth set of attributes includes a type of a customer owning the target asset, a time at which the export of the log occurs, and a time length of continuous operation of the data protection product.

In some embodiments, determining an export time consumed to export a log of the target asset comprises determining the export time using a machine learning model, wherein the machine learning model is a multilayer perceptron that comprises a first hidden layer, a second hidden layer, and a third hidden layer, and a first number of nodes of the first hidden layer is determined by: selecting a specified number based on the number of all attributes of the first set of attributes, the second set of attributes, the third set of attributes, and the fourth set of attributes; and determining the first number of nodes as the smallest positive integer power of 2 greater than or equal to the specified number.

In some embodiments, a second number of nodes of the second hidden layer may be greater than or equal to the first number of nodes, and a third number of nodes of the third hidden layer may be greater than or equal to the first number of nodes.

In some embodiments, the actions further include determining a size of the log of the target asset using the machine learning model.

In some embodiments, the first set of attributes includes the number of Structured Query Language (SQL) assets, the number of file system assets, the number of virtual machine assets, the number of network attached storage (NAS) assets, the number of SAP HANA assets, the number of Kubernetes K8S assets, the number of data protection policies, and the number of data protection phases.

In some embodiments, the second set of attributes includes the number of the target tasks, types of the target tasks, the frequency at which the target tasks are executed, the number of subtasks of the target tasks, the number of successful subtasks, the number of failed subtasks, and the number of canceled subtasks.

In some embodiments, the third set of attributes includes the number of cores of a central processing unit (CPU) of the computing resource, the primary frequency of the cores, an access speed of a storage device, a type of high-speed serial computer expansion bus PCIE, a network bandwidth, and a network delay.

In some embodiments, the actions further include exporting the log of the target asset during the export time.

In an embodiment of the third aspect, an apparatus for exporting a log is provided. The apparatus includes a set acquisition module configured to acquire a first set of attributes indicating a target asset among assets protected by a data protection product, a second set of attributes indicating target tasks executed on the target asset, and a third set of attributes indicating a computing resource running the data protection product. The apparatus further includes a log export module configured to determine an export time consumed to export a log of the target asset based on the first set of attributes, the second set of attributes, and the third set of attributes.

In an embodiment of the fourth aspect, a computer-readable storage medium is provided. The computer-readable storage medium has one or more computer instructions stored thereon, which are executed by a processor to implement the method according to the first aspect.

In an embodiment of the fifth aspect, a computer program product is provided. The computer program product includes one or more computer instructions, wherein the one or more computer instructions, when executed by a processor, implement the method according to the first aspect.

Although the present disclosure has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for exporting a log, comprising:
acquiring a set of attributes indicating a target asset protected by a data protection product;
determining a required export time to export a log of the target asset, using a machine learning model, wherein the machine learning model is a multilayer perceptron comprising:
a first hidden layer;
a second hidden layer; and
a third hidden layer; and
a first number of nodes of the first hidden layer is determined by selecting a specified number based on a number of attributes of the set of attributes, wherein the first number of nodes is a smallest positive integer power of two greater than or equal to the specified number; and
exporting the log of the target asset based on the determined export time.

2. The method according to claim 1, wherein determining the required export time comprises:
determining the required export time based on the set of attributes, wherein the set of attributes comprises a type of a customer owning the target asset, a time at which exporting the log occurs, and a time length of continuous operation of the data protection product.

3. The method according to claim 1, wherein a first number of nodes of the first hidden layer is determined by:
selecting a number based on the number of all attributes of the set of attributes; and
determining the first number of nodes as a smallest positive integer power of two greater than or equal to the number.

4. The method according to claim 1, wherein a second number of nodes of the second hidden layer is greater than or equal to the first number of nodes, and a third number of nodes of the third hidden layer is greater than or equal to the first number of nodes.

5. The method according to claim 1, further comprising:
determining a size of the log of the target asset using the machine learning model.

6. The method according to claim 1, wherein the set of attributes further comprises: a number of Structured Query Language (SQL) assets, a number of file system assets, a number of virtual machine assets, a number of network attached storage (NAS) assets, a number of SAP HANA assets, a number of Kubernetes K8S assets, a number of data protection policies, and a number of data protection phases.

7. The method according to claim 1, wherein the set of attributes further comprises a number of target tasks, types of the target tasks, a frequency at which the target tasks are executed, a number of subtasks of the target tasks, a number of successful subtasks, a number of failed subtasks, and a number of canceled subtasks.

8. The method according to claim 1, wherein the set of attributes further comprises a number of cores of a central processing unit (CPU) of a computing resource, a primary frequency of the cores of the CPU of the computing resource, an access speed of a storage device, a type of a high-speed serial computer expansion bus, a network bandwidth, and a network delay.

9. The method according to claim 1, further comprising: exporting the log of the target asset during the required export time.

10. An electronic device, comprising:
a processor; and
a memory coupled to the processor and having instructions stored therein, which when executed by the processor, cause the processor to perform actions, the actions comprising:
acquiring a set of attributes indicating a target asset protected by a data protection product,
determining an required export time to export a log of the target asset, using a machine learning model, wherein the machine learning model is a multilayer perceptron comprising:
a first hidden layer;
a second hidden layer; and
a third hidden layer; and
a first number of nodes of the first hidden layer is determined by selecting a specified number based on a number of attributes of the set of attributes, wherein the first number of nodes is a smallest positive integer power of two greater than or equal to the specified number; and exporting the log of the target asset based on the determined export time.

11. The electronic device according to claim 10, wherein determining the required export time comprises:
determining the required export time based on the set of attributes, wherein the set of attributes comprises a type of a customer owning the target asset, a time at which exporting the log occurs, and a time length of continuous operation of the data protection product.

12. The electronic device according to claim 10, a first number of nodes of the first hidden layer is determined by:
selecting a number based on the number of all attributes of the set of attributes; and
determining the first number of nodes as a smallest positive integer power of two greater than or equal to the number.

13. The electronic device according to claim 10, wherein a second number of nodes of the second hidden layer is greater than or equal to the first number of nodes, and a third number of nodes of the third hidden layer is greater than or equal to the first number of nodes.

14. The electronic device according to claim 10, wherein the actions further comprise:
determining a size of the log of the target asset using the machine learning model.

15. The electronic device according to claim 10, wherein the set of attributes further comprises: a number of Structured Query Language (SQL) assets, a number of file system assets, a number of virtual machine assets, a number of network attached storage (NAS) assets, a number of SAP HANA assets, a number of Kubernetes K8S assets, a number of data protection policies, and a number of data protection phases.

16. The electronic device according to claim 10, wherein the set of attributes further comprises a number of target tasks, types of the target tasks, a frequency at which the target tasks are executed, a number of subtasks of the target tasks, a number of successful subtasks, a number of failed subtasks, and a number of canceled subtasks.

17. The electronic device according to claim 10, wherein the set of attributes further comprises a number of cores of a central processing unit (CPU) of a computing resource, a primary frequency of the cores of the CPU of the computing resource, an access speed of a storage device, a type of a high-speed serial computer expansion bus, a network bandwidth, and a network delay.

18. The electronic device according to claim 10, wherein the actions further comprise:
exporting the log of the target asset during the required export time.

19. A non-transitory computer-readable storage medium having instructions stored therein, which when executed by a processor, cause the processor to perform actions, the actions comprising:
acquiring a set of attributes indicating a target asset protected by a data protection product;
determining a required export time to export a log of the target asset, using a machine learning model, wherein the machine learning model is a multilayer perceptron comprising:
a first hidden layer;
a second hidden layer; and
a third hidden layer; and
a first number of nodes of the first hidden layer is determined by selecting a specified number based on a number of attributes of the set of attributes, wherein the first number of nodes is a smallest positive integer power of two greater than or equal to the specified number; and
exporting the log of the target asset based on the determined export time.

20. The non-transitory computer-readable storage medium of claim 19, wherein determining the required export time comprises:
determining the required export time based on the set of attributes, wherein the set of attributes comprises a type of a customer owning the target asset, a time at which exporting the log occurs, and a time length of continuous operation of the data protection product.

* * * * *

UNITED STATES PATENT AND TRADEMARK OFFICE
CERTIFICATE OF CORRECTION

PATENT NO. : 12,174,721 B2
APPLICATION NO. : 17/729832
DATED : December 24, 2024
INVENTOR(S) : Huifeng Li et al.

Page 1 of 1

It is certified that error appears in the above-identified patent and that said Letters Patent is hereby corrected as shown below:

In the Claims

In Column 12, Claim 1, Lines 44-45, delete "exporting the log of the target asset based on the determined export time" and insert --exporting the log of the target--.

In Column 13, Claim 10, Line 32, delete "determining an required export time" and insert --determining a required export time--.

In Column 13, Claim 10, Lines 44-45, delete "exporting the log of the target asset based on the determined export time" and insert --exporting the log of the target--.

In Column 13, Claim 12, Line 53, delete "according to claim 10, a first" and insert --according to claim 10, wherein a first--.

In Column 14, Claim 19, Lines 52-53, delete "exporting the log of the target asset based on the determined export time" and insert --exporting the log of the target--.

Signed and Sealed this
Twenty-seventh Day of May, 2025

Coke Morgan Stewart
*Acting Director of the United States Patent and Trademark Office*